(12) United States Patent
Petrucelli

(10) Patent No.: US 10,668,773 B2
(45) Date of Patent: *Jun. 2, 2020

(54) AUTOMOTIVE SAFETY DEVICE

(71) Applicant: Measurement Ltd., Grand Cayman (KY)

(72) Inventor: Steven Petrucelli, Cranbury, NJ (US)

(73) Assignee: Measurement Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,566

(22) Filed: Aug. 23, 2019

(65) Prior Publication Data

US 2019/0375238 A1 Dec. 12, 2019

Related U.S. Application Data

(63) Continuation of application No. 16/160,255, filed on Oct. 15, 2018, now Pat. No. 10,391,814, which is a
(Continued)

(51) Int. Cl.
*F21V 21/26* (2006.01)
*B60C 7/00* (2006.01)
(Continued)

(52) U.S. Cl.
CPC .................. *B60C 7/00* (2013.01); *B25D 1/02* (2013.01); *B25F 1/006* (2013.01); *B60Q 7/00* (2013.01);
(Continued)

(58) Field of Classification Search
CPC ....................................................... B60Q 7/00
See application file for complete search history.

(56) References Cited

U.S. PATENT DOCUMENTS 4,631,831 A 12/1986 Bacher et al.
4,739,457 A 4/1988 Orr
(Continued)

FOREIGN PATENT DOCUMENTS

CN 1769757 A 5/2006
CN 2881297 Y 3/2007
(Continued)

OTHER PUBLICATIONS

International Search Report dated Mar. 6, 2014 for related application PCT/US2010/066943.
(Continued)

*Primary Examiner* — Andrew J Coughlin
(74) *Attorney, Agent, or Firm* — Howard IP Law Group, PC

(57) ABSTRACT

An automotive safety device includes a housing and a removable support assembly having a base and support members pivotally attached to the base and moveable between a first, closed position and a second, open position. Each support member is arranged directly adjacent to an outer surface of the housing in the first position. In the second position, the support members allow the device to be freestanding. A first light source is arranged on the housing such that the device may function as an emergency roadside light. The device further includes a tire pressure gauge, including a pressure sensor, a processor, and a display, wherein the processor is configured to output a value on the display indicative of a measured pressure.

20 Claims, 17 Drawing Sheets

Related U.S. Application Data continuation of application No. 14/954,344, filed on Nov. 30, 2015, now Pat. No. 10,105,990, which is a continuation of application No. 13/942,265, filed on Jul. 15, 2013, now Pat. No. 9,243,787, which is a continuation-in-part of application No. 13/804,210, filed on Mar. 14, 2013, now Pat. No. 9,114,752.

(60) Provisional application No. 61/719,460, filed on Oct. 28, 2012.

(51) Int. Cl.
| | |
|---|---|
| *B25D 1/02* | (2006.01) |
| *B60Q 7/00* | (2006.01) |
| *B25F 1/00* | (2006.01) |
| *F21V 33/00* | (2006.01) |
| *F21W 111/00* | (2006.01) |

(52) U.S. Cl.
CPC .......... *F21V 21/26* (2013.01); *F21V 33/0076* (2013.01); *F21V 33/0084* (2013.01); *B25D 2250/271* (2013.01); *B25D 2250/295* (2013.01); *F21V 33/0064* (2013.01); *F21W 2111/00* (2013.01)

(56) References Cited

U.S. PATENT DOCUMENTS

| | | |
|---|---|---|
| 4,970,894 A | 11/1990 | Huang |
| 4,998,438 A | 3/1991 | Martin |
| D317,880 S | 7/1991 | Meehan |
| D366,846 S | 2/1996 | Handfield et al. |
| 5,630,660 A | 5/1997 | Chen |
| D390,140 S | 2/1998 | Germanton |
| D395,835 S | 7/1998 | Okuyama et al. |
| 5,883,306 A | 3/1999 | Hwang |
| 5,895,845 A | 4/1999 | Burger |
| D409,509 S | 5/1999 | Petrucelli et al. |
| D409,931 S | 5/1999 | Petrucelli et al. |
| 5,931,560 A | 8/1999 | Hoffman |
| 5,952,916 A | 9/1999 | Yamabe |
| 5,987,978 A | 11/1999 | Whitehead |
| 6,099,141 A | 8/2000 | Landamia |
| 6,099,142 A | 8/2000 | Liu |
| D440,893 S | 4/2001 | Van Zeyl |
| D440,894 S | 4/2001 | Van Zeyl |
| D440,895 S | 4/2001 | Van Zeyl |
| D441,674 S | 5/2001 | Van Zeyl |
| D447,970 S | 9/2001 | Cappiello et al. |
| D450,257 S | 11/2001 | Bressler et al. |
| D455,666 S | 4/2002 | Cappiello et al. |
| D459,257 S | 6/2002 | Petrucelli |
| D459,668 S | 7/2002 | Petrucelli |
| D462,627 S | 9/2002 | Petrucelli |
| 6,516,659 B2 | 2/2003 | Chen |
| 6,634,223 B2 | 10/2003 | Hartmann et al. |
| 7,010,969 B1 | 3/2006 | Huang |
| D522,894 S | 6/2006 | Stowers et al. |
| 7,063,444 B2 | 6/2006 | Lee et al. |
| D524,667 S | 7/2006 | Fujioka |
| D524,669 S | 7/2006 | Stowers et al. |
| D526,229 S | 8/2006 | Stowers et al. |
| D526,589 S | 8/2006 | Stowers et al. |
| D526,922 S | 8/2006 | Stowers et al. |
| D528,934 S | 9/2006 | Stowers et al. |
| D534,092 S | 12/2006 | Kuskovsky |
| D564,383 S | 3/2008 | Petrucelli et al. |
| D596,970 S | 7/2009 | Petrucelli |
| D603,733 S | 11/2009 | Stowers et al. |
| D606,435 S | 12/2009 | Zheng |
| D631,766 S | 2/2011 | Petrucelli |
| D631,768 S | 2/2011 | Petrucelli et al. |
| 7,928,960 B2 | 4/2011 | Baldo et al. |
| D648,236 S | 11/2011 | Rodrig |
| 8,201,979 B2 | 6/2012 | Deighton et al. |
| D671,017 S | 11/2012 | Petrucelli et al. |
| D671,025 S | 11/2012 | Stowers |
| D683,643 S | 6/2013 | Stowers et al. |
| 2002/0057061 A1 | 5/2002 | Mueller et al. |
| 2003/0067771 A1 | 4/2003 | Kung |
| 2003/0227773 A1 | 12/2003 | Yang |
| 2005/0092878 A1 | 5/2005 | Murray et al. |
| 2005/0103108 A1 | 5/2005 | Little et al. |
| 2007/0019398 A1 | 1/2007 | Chen et al. |
| 2008/0239730 A1 | 10/2008 | Chien |
| 2011/0122605 A1 | 5/2011 | Deighton et al. |
| 2011/0157882 A1 | 6/2011 | Wessel |
| 2012/0168030 A1 | 7/2012 | Ohm et al. |

FOREIGN PATENT DOCUMENTS

| | | |
|---|---|---|
| CN | 201209774 Y | 3/2009 |
| CN | 102072411 A | 5/2011 |
| CN | 202302766 U | 7/2012 |
| CN | 202387141 U | 8/2012 |
| KR | 20-2011-0004387 U | 5/2011 |
| KR | 20120069068 A | 6/2012 |

OTHER PUBLICATIONS

Written Opinion of the International Searching Authority dated Mar. 6, 2014 for related application PCT/US2010/066943.

European Search Report, dated Dec. 9, 2016, for related European patent application No. 13849403.

AUTOMOTIVE SAFETY DEVICE

CROSS-REFERENCE TO RELATED APPLICATIONS

This application is a continuation of copending U.S. patent application Ser. No. 16/160,255, filed Oct. 15, 2018, which is a continuation of U.S. patent application Ser. No. 14/954,344, filed Nov. 30, 2015, now issued as U.S. Pat. No. 10,105,990, which is a continuation of U.S. patent application Ser. No. 13/942,265, filed Jul. 15, 2013, now issued as U.S. Pat. No. 9,243,787, which is a continuation-in-part of U.S. patent application Ser. No. 13/804,210, filed Mar. 14, 2013, now issued U.S. Pat. No. 9,114,752, which claims the benefit of and priority to U.S. Provisional Patent Application Ser. No. 61/719,460, filed Oct. 28, 2012, the entire disclosures of which are incorporated by reference herein for all purposes.

FIELD OF THE INVENTION

The present invention relates generally to multifunction automotive safety devices.

BACKGROUND

Safe and efficient operation of a motor vehicle requires both proper maintenance and equipment, including tools useful in emergency situations. For example, disabled vehicles on a roadway present a serious safety hazard. For this reason, proper emergency lighting for alerting approaching traffic (e.g. road flares), as well as flashlights, are useful safety tools that an automobile owner may wish to have at his or her disposal. Other tools, such a safety hammer for breaking automotive glass, as well as a cutting blade for removing a malfunctioning or otherwise irremovable seatbelt, have become increasingly popular to carry onboard a vehicle. These tools may provide a means for driver and passenger egress from a vehicle that has been, for example, damaged or submerged underwater. Likewise, periodically checking a vehicle's tire pressures to ensure proper inflation can lead to decreased fuel consumption, in addition to providing a measure of safety. Thus, a tire pressure gauge is also a popular tool for a driver to have.

Previous attempts to bring these and other tools to a driver have consisted of automobile safety kits comprising one or more of these items stored in a common container. However, these kits are usually bulky, requiring storage in, for example, the trunk of a car, wherein access thereto may be limited in emergency situations.

Alternative systems for providing immediate access to a variety of useful automotive safety tools are desired.

SUMMARY

In one embodiment of the present disclosure, an automotive safety device is provided. The device includes a housing having a plurality of support members pivotally attached thereto and moveable between a first, closed position and a second, open position. In the first position, the support members are arranged along an outer surface of the housing. In the second position, the support members extend outward and provide for the device to be freestanding. A first light source is arranged on the housing such that the device may function as an emergency roadside light. The device further includes a tire pressure gauge, including a pressure sensor, a processor, and a display, wherein the processor is configured to output a value on the display indicative of a measured pressure.

In another embodiment of the present disclosure, the above-described automotive safety device further includes a flashlight, as well as an emergency hammer and seatbelt cutting blade integrated into the housing.

In yet another embodiment of the present disclosure, a safety light is provided. The light includes a housing and a plurality of support members moveable between a first position along the exterior surface of the housing and a second position extending from the housing and configured to maintain the housing in a free-standing position. First and second light sources are provided on the housing for emitting light both radially away from the housing, and generally axially with respect to the housing. At least one processor is provided and configured to control the output of the first light source.

In yet another embodiment, an automotive safety device is provided including a housing having a support base removably attached thereto. The support base is attachable to the housing in a first configuration having a first orientation with respect to the housing, and attachable in a second configuration having a second orientation with respect to the housing. A plurality of support members are pivotally attached to the support base and moveable between a first position and a second position. The support members may be arranged along an outer surface of the housing in the first position when the support base is attached to the housing in the first configuration, and may extend outward from the housing in the second position to define a freestanding support structure when the support base is attached to the housing in the second configuration. The device also may comprise a first light source arranged on the housing, and a processor arranged within the housing and in communication with the first light source. The processor is configured to control the output of the first light source.

DETAILED DESCRIPTION

Figure 1:
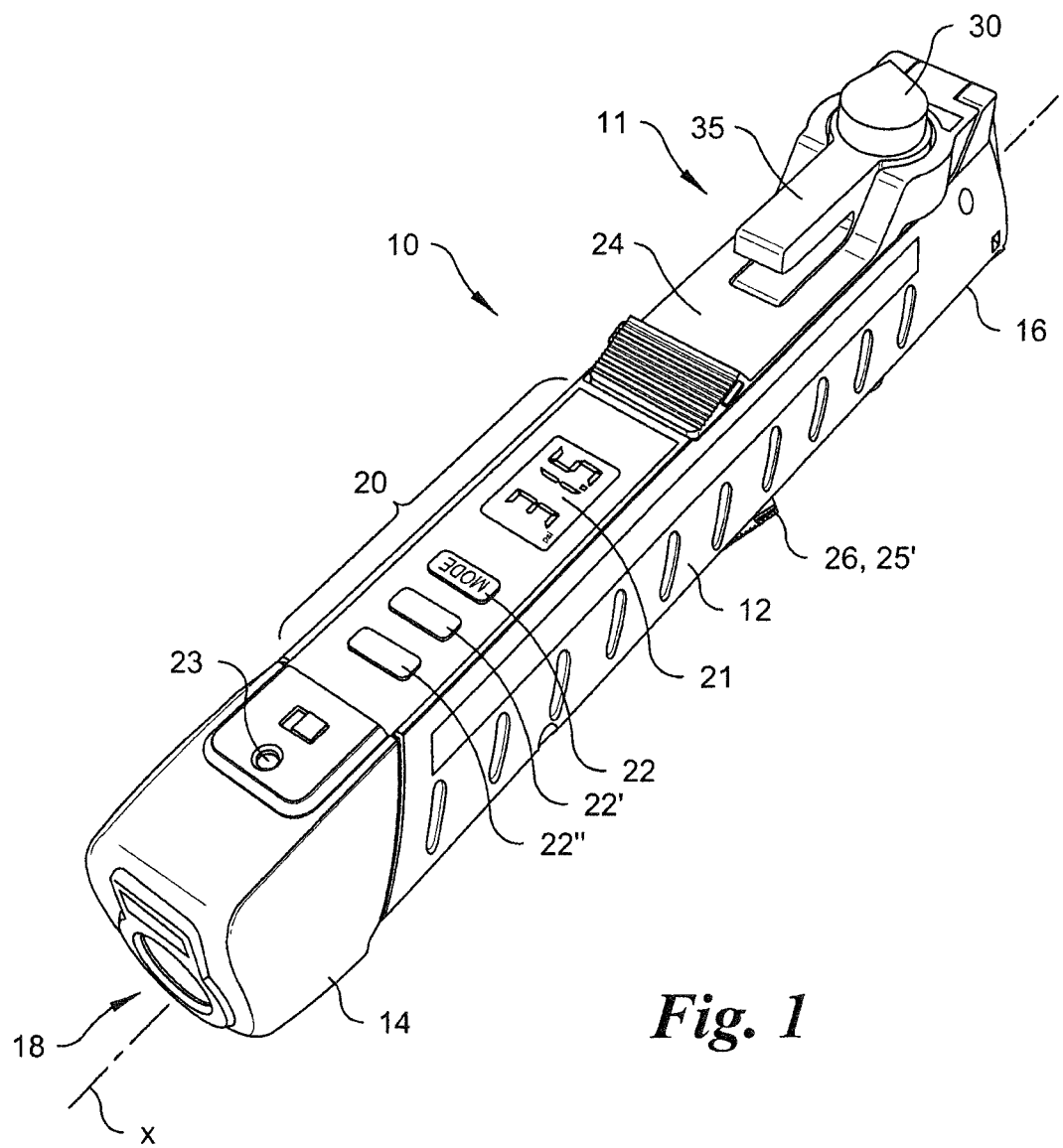
FIG. 1 is a perspective view of an automotive safety device according to an embodiment of the present disclosure.

It is to be understood that the figures and descriptions of the present invention have been simplified to illustrate elements that are relevant for a clear understanding of the present invention, while eliminating, for purposes of clarity, many other elements found in pressure measuring devices and light emitting devices. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include automotive safety devices which incorporate a plurality of useful features into a single convenient package. In an exemplary embodiment, the device includes a generally elongated housing having a built-in flashlight assembly, including a first light source arranged at an end of the housing and configured to emit light in a generally axial direction with respect thereto. The device further includes an emergency lighting assembly (i.e. an emergency roadside light or beacon), including a second light source arranged on a side of the housing and configured to emit light in a direction generally radially away from the housing.

The device further includes a plurality of support members, or support legs, pivotally attached to the housing. The support members are moveable between a first, or closed position, and a second, open or deployed position. In the first position, the support members are oriented in a low-profile manner with respect to the housing (e.g. axially along an outer surface of the housing). In the second position, the support members are oriented in such a manner as to provide freestanding support of the device. In the second position, the support members may extend away from the housing to provide freestanding support of the device. In the second position, the support members may be configured to provide freestanding support by maintaining the device standing, with the housing having its long axis at a generally fixed relation, such as generally orthogonal, to a surface on which ends of the support members are resting. In the second position, the support members define a freestanding support structure. The support members may be releasably secured in the first and second positions via an actuator arranged on the housing. When deployed, the support members and the emergency lighting arrangement may act as a replacement for conventional roadside flares. While moveable support members will be generally shown and described herein, it should be understood that other embodiments may include support members that are fixed in an open position.

In an alternate embodiment of the present disclosure, a device includes a removable support assembly, including a plurality of support members or support legs pivotally attached to a support base. The support base is removably attached to an end portion of a housing of the device. Similar to the embodiments described above, the support members are moveable between a first or closed position, and a second or open position. In one embodiment, the support assembly may be attached to the housing in a first configuration such that when operating the device as, for example, a flashlight or safety hammer, support members arranged in the first position are oriented in a low-profile manner with respect to the housing (e.g. axially along an outer surface of the housing). In order to utilize the device as a free-standing emergency light, the support members may be biased (e.g. rotated) into the second position, and the support assembly reoriented into a second configuration with respect to the housing. More specifically, the support base and support members are removed or detached from an end of the housing, reoriented with respect to the housing (e.g. inverted), and reattached thereto. Once reattached, the support members are positioned so as to provide freestanding support by maintaining the device standing, with the housing having its long axis at a generally fixed relation, such as generally orthogonal, to a surface on which ends of the support members are resting. The support members may be held in either the first of the second positions via one or more mechanical stops incorporated into the support base and/or the support members.

In other embodiments of the present disclosure, the above devices may also comprise additional features, such as an emergency hammer and seatbelt cutter, as well as a tire pressure gauge packaged on and/or within the housing. In this way, embodiments of the present disclosure provide a convenient, multifunction emergency tool that may be stored in the passenger compartment of a vehicle so as to allow for ease of access in the event of an emergency.

One or more of the support members may include apertures having profiles to permit the support members to pass over one or more of the additional features when the support members are in the first, closed, position. By way of example, one or more support members may have defined therein apertures suitable to pass over one or more of the emergency hammer, seatbelt cutter, nozzle of a tire pressure gauge, display for displaying tire pressure data, emergency lighting arrangement and user interface devices. The apertures may generally correspond in profile to the respective emergency hammer, guard of the seatbelt cutter, nozzle, display, emergency lighting arrangement and user interface devices, sufficient clearance being provided in the apertures to clear the respective elements as the support members rotate.

Referring generally to FIGS. 1-5, an automotive safety device 10 according to an exemplary embodiment of the present disclosure is shown. Device 10 includes a housing 12 having a generally elongated profile, which housing is sized and contoured to be held in the hand of a user. Housing 12 comprises a first end 14 and a second end 16. In the illustrated embodiment, first end 14 is configured to accommodate all or part of a flashlight 18, including one or more light sources 19 (see FIG. 4), such as LEDs configured to emit light in a generally axial direction along axis x between first and second ends 14,16 with respect to housing 12.

Second end 16 of housing 12 may include an emergency hammer head 30 arranged on a first side thereof. Hammer head 30 may include a hardened steel or other metal head having a point formed thereon. Hammer head 30, in conjunction with housing 12, forms an emergency hammer which may be utilized by a vehicle operator or passenger to break automotive glass in case of an emergency, such as to break a window of a vehicle for providing emergency egress. Second end 16 also features an emergency cutting tool 11 useful for cutting away, for example, a seatbelt, in the event that one is not able to detach the belt in a conventional manner. As implemented, cutting tool 11 comprises a blade portion fixedly attached to housing 12 (e.g. blade 36, FIG. 2), as well as a protective guard 35 which may be integrally formed with housing 12.

Figure 2:
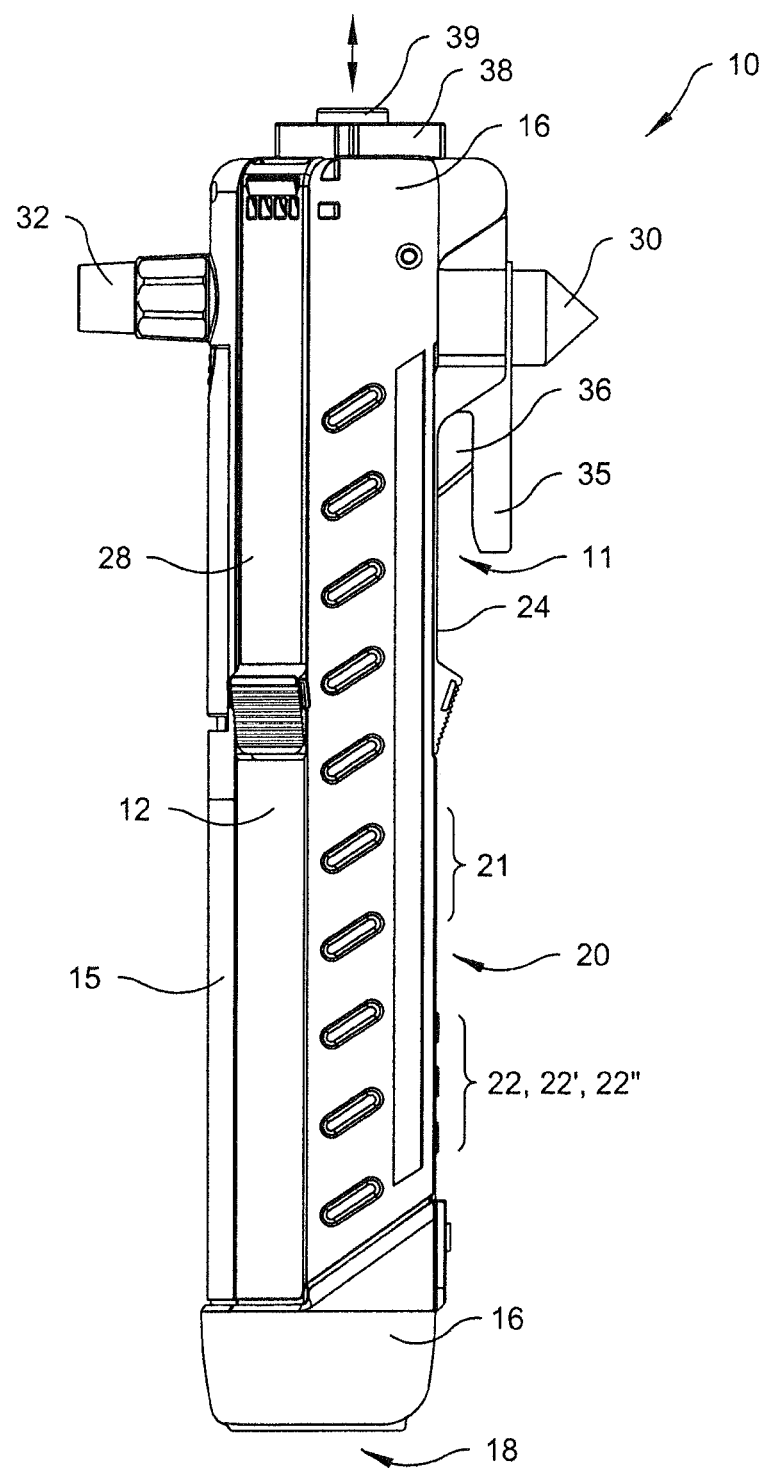
FIG. 2 is a side view of the embodiment of the present disclosure of FIG. 1.

Device 10 may further comprise a tire pressure gauge, including a nozzle 32 arranged on a second side of housing 12, opposite the first side (FIG. 2). Nozzle 32 is arranged in communication with a pressure sensor (e.g. pressure sensor 64, FIG. 7) and adapted to engage with and open a valve (e.g. a needle or Schrader valve) of a pneumatic tire valve stem in a conventional manner for providing a fluid communication path so as to provide pressurized fluid to the pressure sensor. The output of the pressure sensor may be provided to a processing arrangement, and a display 21 (FIG. 1) for providing a visual indication of the tire pressure to a user. In the illustrated embodiment, display 21 is arranged on a control panel 20 on the first side of housing 12. As control panel 20, including display 21, is arranged generally on an opposite side of housing 12 to nozzle 32, the user may engage a tire valve stem using nozzle 32 and readily read a measured tire pressure on display 21. As control panel 20, including display 21, is located away from second end 16 of housing 12 and thus axially separated from nozzle 32 by about one half the length of housing 12, the user may readily hold the housing 12 near second end 16 to position nozzle 32 on a tire valve stem, while display 21 is visible and not covered by the user's hand. Control panel 20 further includes a plurality of user-activated buttons 22,22', 22" for operating additional device features as will be set forth in detail herein.

Figure 3:
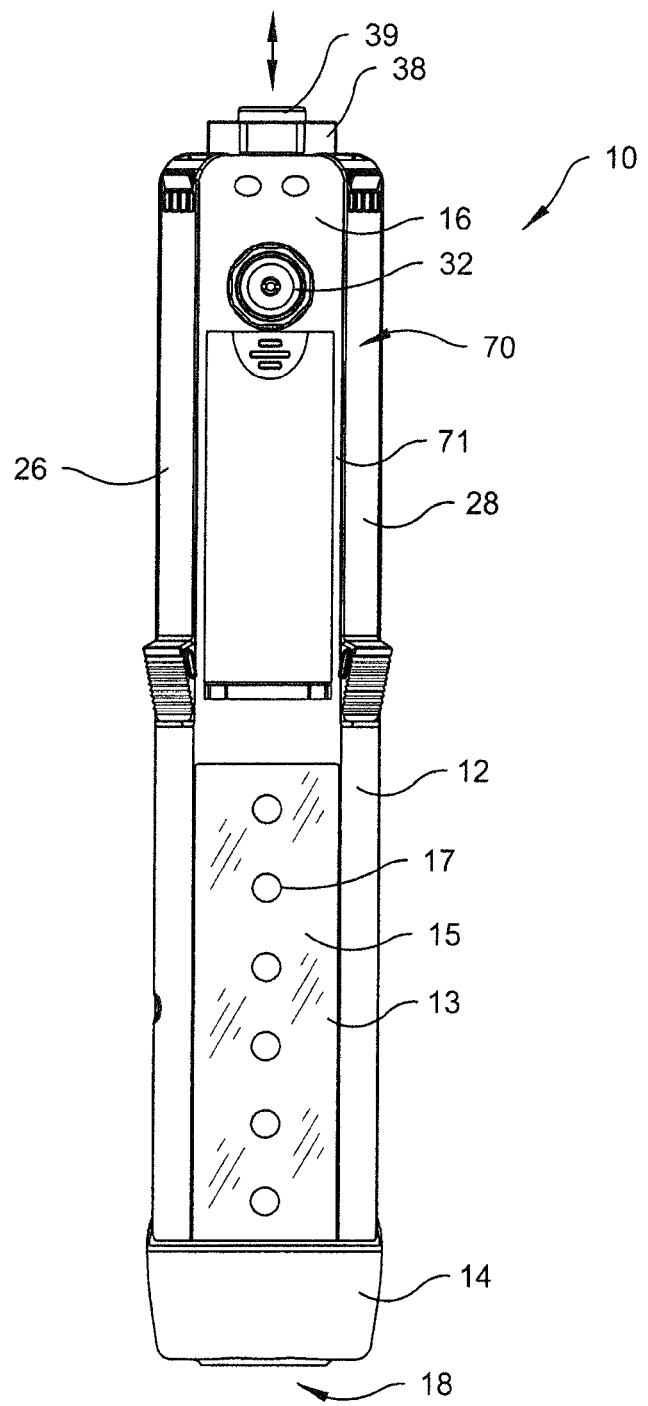
FIG. 3 is a front view of the embodiment of the present disclosure of FIG. 1.

Referring generally to FIGS. 2 and 3, device 10 includes an emergency lighting assembly 15. In the exemplary illustrated embodiment, emergency lighting assembly 15 is arranged generally on the second side of housing 12, and may comprise a plurality of light sources 17, such as LEDs, for providing bright, high-visibility lighting. Emergency lighting assembly 15 may feature a translucent cover 13 arranged over light sources 17. In one embodiment, cover 13 is colored, for example, red or orange, for alerting approaching traffic to an emergency situation when light sources 17 are illuminated. Cover 13 may also be textured such that light generated by light sources 17 is diffused or refracted in a desired radiation pattern, increasing the visibility of device 10.

Light sources 17 of emergency lighting assembly 15 may operate in any number of modes of operation, including continuous output, flashing sequences, and the like. Emergency lighting assembly 15 is arranged in an elongated manner commencing near first end 14 of housing 12. Further, while the exemplary emergency lighting assembly 15 is shown as arranged on a single side of device 10, it should be understood that embodiments of the present disclosure may comprise an emergency lighting assembly arranged on additional sides of device 10, including lighting which is arranged continuously around a circumference of device 10, without departing from the scope of the present disclosure.

Embodiments of the present disclosure may also include providing a reflective exterior surface on one or more faces of housing 12. For example, reflective tape, reflective paint or other reflective materials may be applied to and caused to adhere to all of or portions of the outer surface of housing 12, including as multiple elongated strips of reflective tape, paint or other material extending at least a portion of the length of housing 12 between its respective ends. In embodiments, reflective materials, such as particles of reflective metals or other materials may be integrated into housing 12, such as by being included in a plastic material from which housing 12 is molded. Reflective particles may in embodiments be applied to an outer surface of housing 12 after molding. Reflective materials on an outer surface of housing 12 improve visibility of device 10, even in the event emergency lighting assembly 15 malfunctions.

Figure 6:
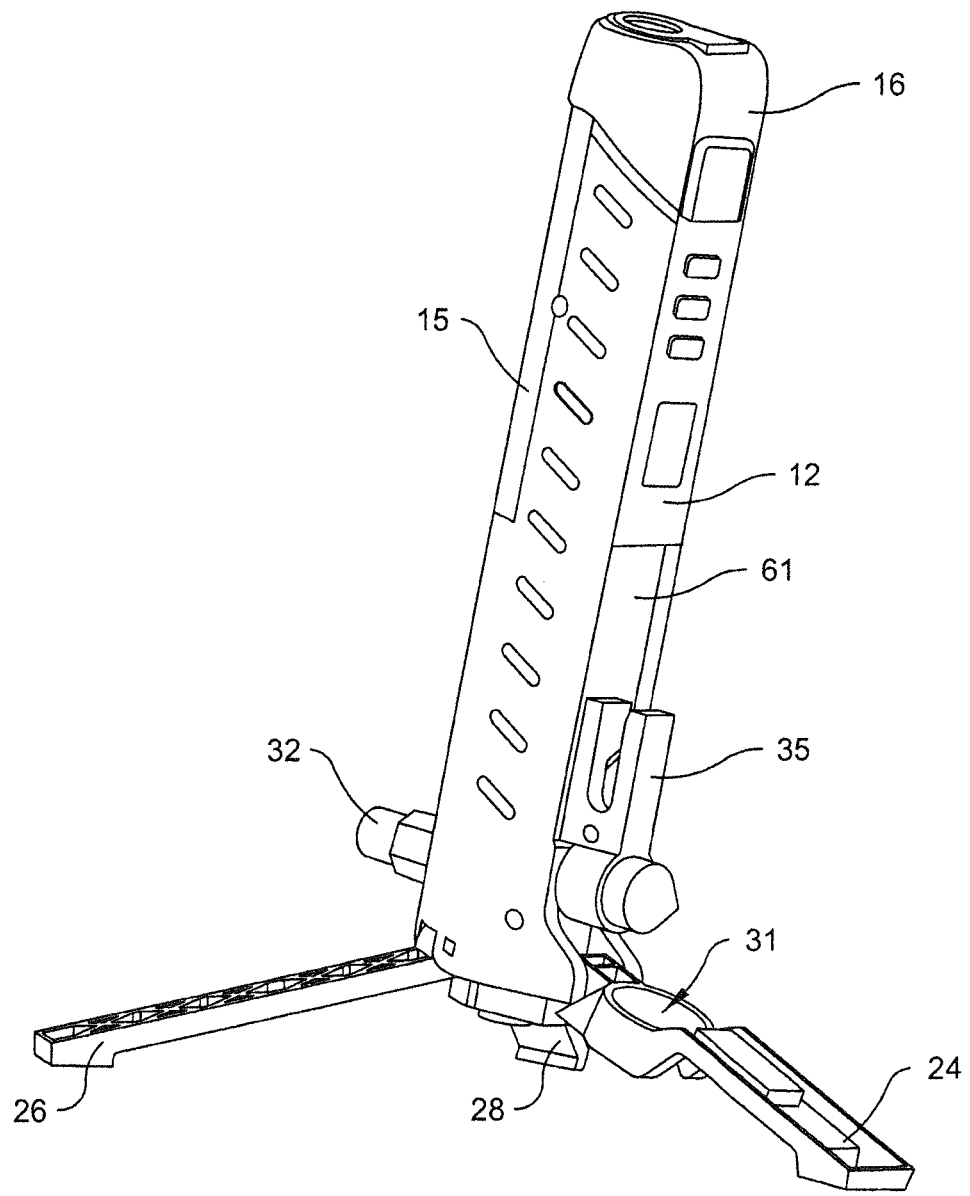
FIG. 6 is a perspective view of the embodiment of the present disclosure of FIG. 1, having support members shown in an open or deployed position.

Device 10 further comprises a support structure, enabling device 10 to take on a freestanding configuration when used, for example, in an emergency lighting application. In the exemplary embodiment, the support structure comprises three support members or legs 24,26,28, each pivotally attached on a first end thereof to housing 12, at housing second end 16. Support members 24,26,28 are moveable between a first, or closed position (see FIGS. 1-5), and a second, deployed or open position (see FIGS. 6-9B). In the first position, support members 24,26,28 are oriented generally axially along an outer surface of housing 12. In one exemplary embodiment, support members 24,26,28 may be arranged in complementary recesses 61 (see FIG. 6) formed in the outer surface of housing 12. Support member 24 may comprise one or more apertures formed therein which correspond in profile to hammer head 30 and the seatbelt cutter such that support member 24 may be maintained in the closed position without being obstructed by these features. Thus, with support members 24,26,28 in the first position, device 10 is configured for storage with minimal additional volume required to accommodate support members 24,26, 28. With support members 24,26,28 in the first position, device 10 may readily be maneuvered and gripped by a user when employed as any one of a tire pressure gauge, flashlight, hammer and seatbelt cutter.

The length of support members 24,26,28 is substantially less than the length of housing 12. Thus, between distal ends of support members 24,26,28 and housing first end 14 there is a portion of exterior surface of housing 12. Control panel 20, including display 21, may be arranged on the portion of exterior surface intermediate the distal end of support member 24 and first end 14 of housing 12.

In the second position, support members 24,26,28 are oriented in such a manner as to provide freestanding support for device 10. More specifically, respective support members 24,26,28 are spaced generally 120° from one another about a circumference of housing 12, forming a tripod-like support structure for providing a stable, freestanding base for device 10. In this way, an operator may deploy support members 24,26,28, place device 10 in view of oncoming traffic, and activate emergency lighting assembly 15 such that device 10 operates as an emergency lighting systems alerting other motorists to an emergency situation, such as a disabled vehicle.

Figure 8A:
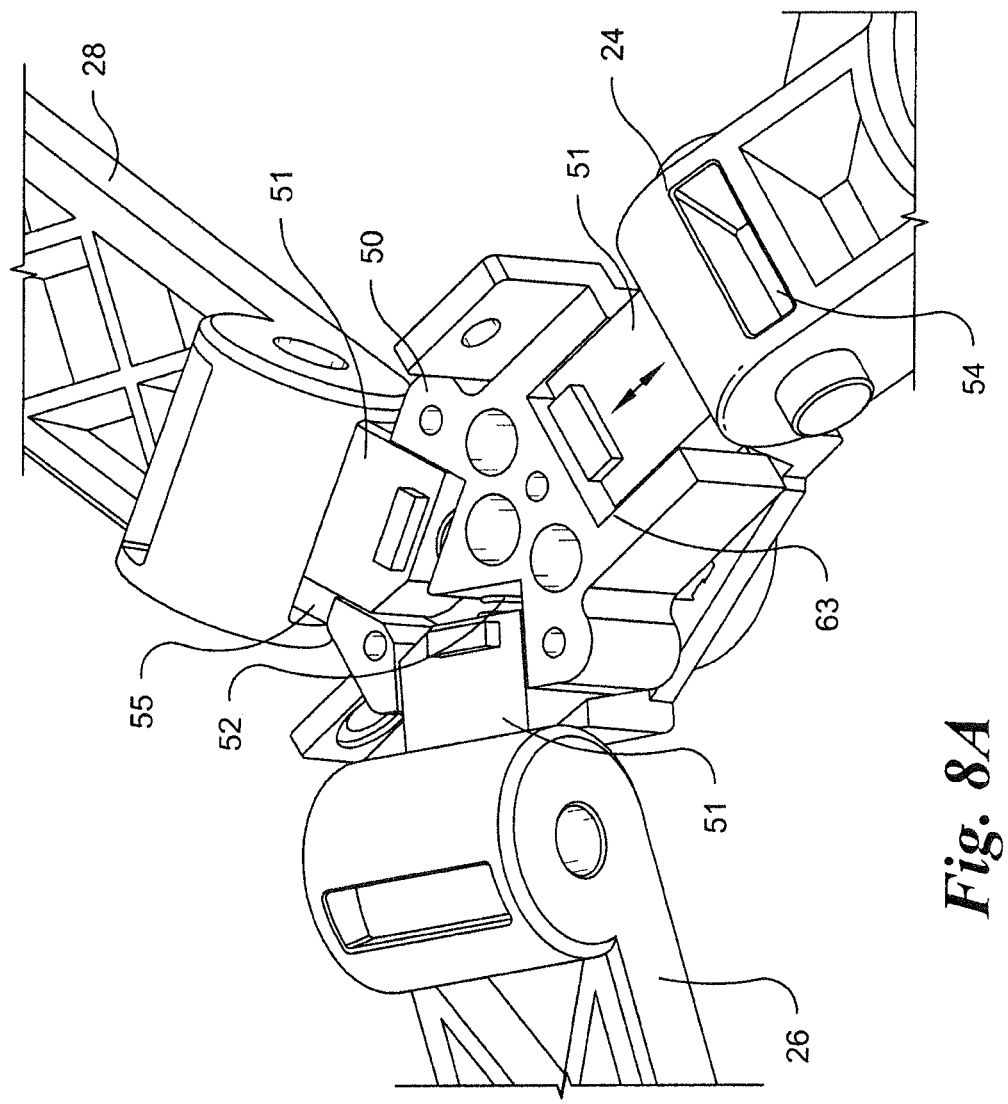
FIGS. 8A and 8B are a partial perspective views showing a portion of a support member release and locking mechanism according to an embodiment of the present disclosure.
Figure 8B:
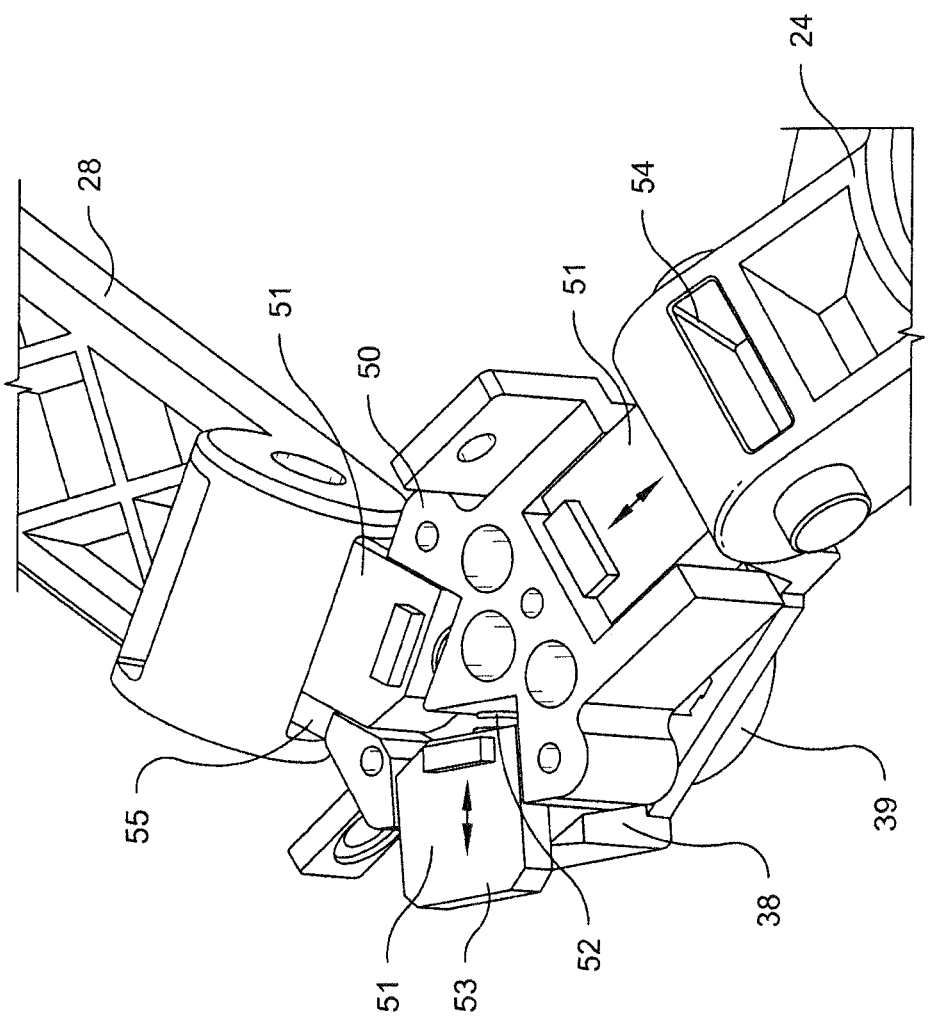

Device 10 further includes a locking mechanism, including an actuator 38 (see FIGS. 2, 3 and 5) for selectively securing support members 24,26,28 in the first and second positions. More specifically, FIGS. 8A-9B illustrate partial perspective views of a locking mechanism, which includes support member stops 51 for engaging with a corresponding support member 24,26,28. In the illustrated embodiment, support member stops 51 are slidably arranged in a respective aperture 63 of a fixed locking mechanism base 50. Elastic elements 52 (e.g. coil springs) are arranged between base 50 and each support member stop 51 and act to bias support member stops 51 radially outward from base 50 in the indicated direction. Each support member stop 51 comprises a protruding surface 53 (see FIG. 8B, wherein support member 26 has been removed for clarity) which interfaces with one of a corresponding recess 54,55 formed in an end of a respective support member 24,26,28. As illustrated in FIGS. 8A and 8B, support members 24,26,28 are locked in the second or open position when support member stops 51 are biased radially outward and into engagement with recesses 55 formed in each of support members 24,26,28. This engagement, corresponding to a locked position of support member stops 51, prevents movement (i.e. collapse) of support members 24,26,28 relative to housing 12. Likewise, engagement of support member stops 51 with recesses 54 secure support members 24,26,28 in the first or closed position.

Figure 9A:
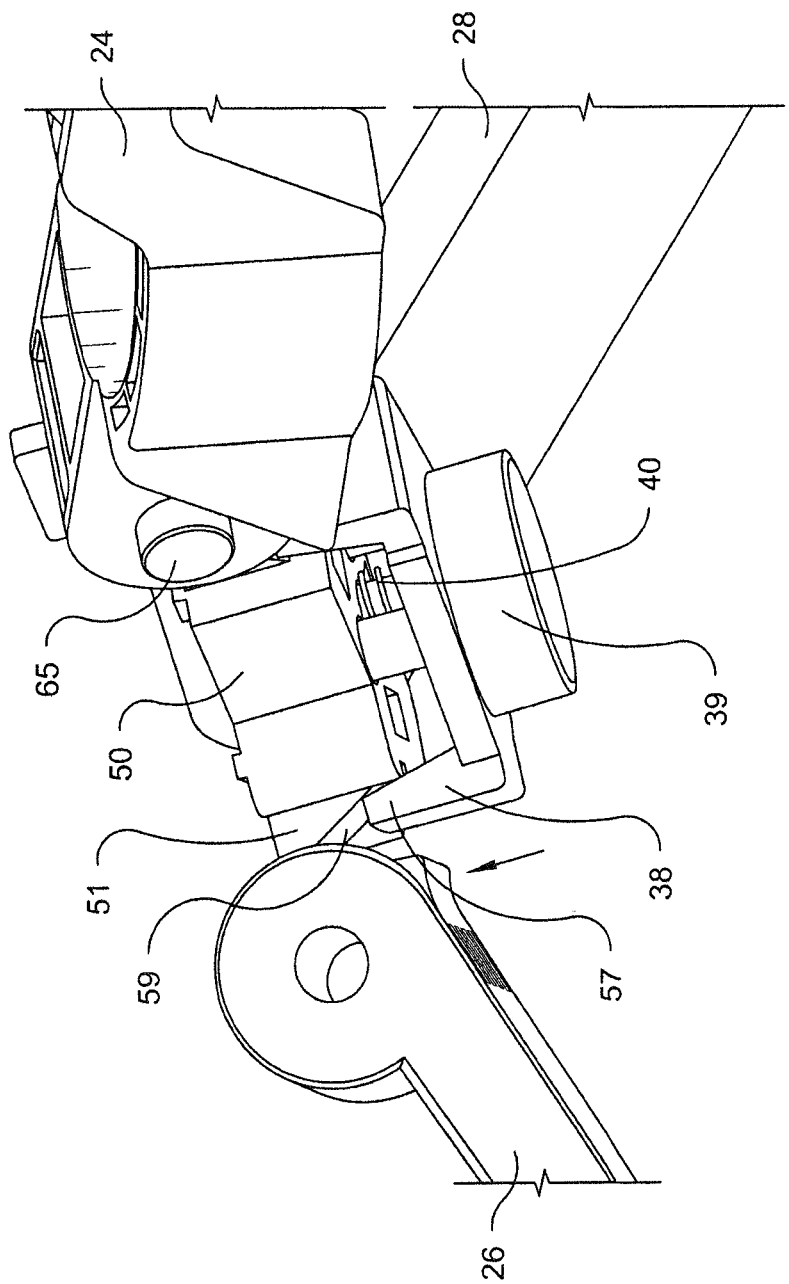
FIGS. 9A and 9B are additional partial perspective views showing a portion of the support member release and locking mechanism of the embodiment of FIGS. 8A and 8B.
Figure 9B:
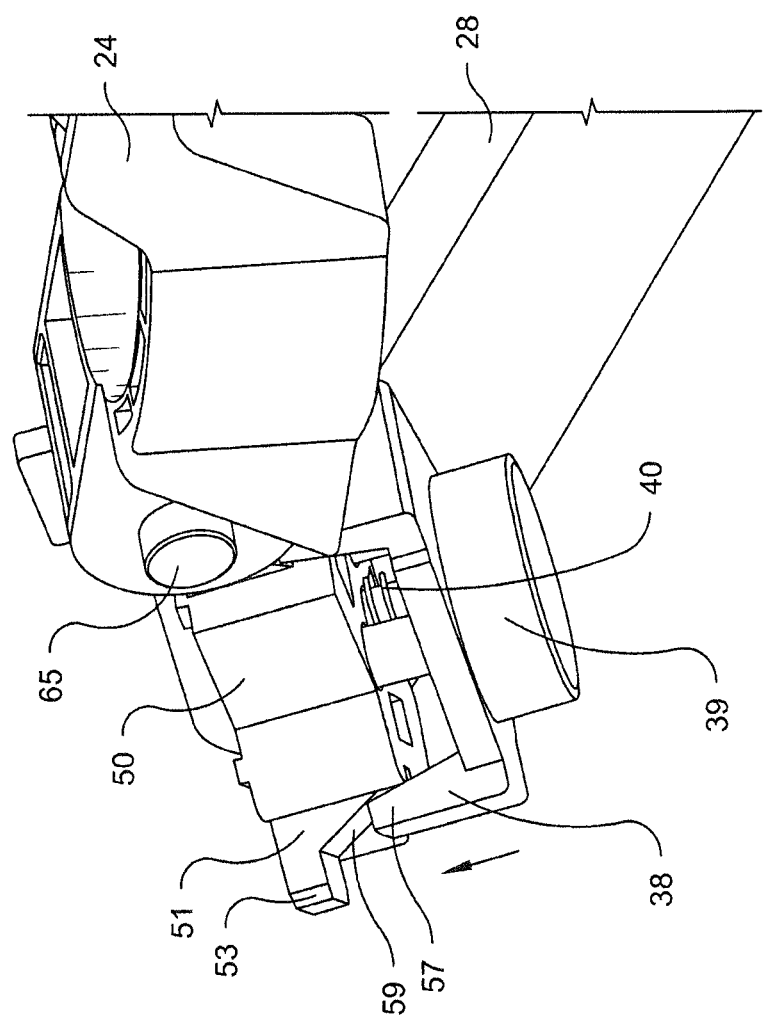

Referring generally to FIGS. 9A and 9B, support members 24,26,28 may be released from either the first or second position via displacement of actuator 38. In the exemplary embodiment, actuator 38 is moveably attached to housing 12 and comprises three fingers 57 extending therefrom for engaging with a corresponding one of support member stops 51. Biasing actuator 38 via button 39 in the direction indicated by arrow in the figures places fingers 57 of actuator 38 into contact with tapered or ramped surfaces 59 of support member stops 51. As actuator 38 is further depressed, fingers 57 displace support member stops 51 radially inward with respect to base 50, against the bias of elastic elements 52 until support member stops 51 have been retracted from engagement with one of recesses 54,55 formed in respective support members 24,26,28. Once support member stops 51 are disengaged, corresponding to an unlocked position, a user may pivot each support members 24,26,28 about a pivoting point 65 into a desired position while maintaining pressure on button 39. Releasing button 39 of actuator 38 allows support member stops 51 travel radially outward with respect to base 50, and into engagement with the other one of recesses 54,55. In the exemplary embodiment, actuator 38 is biased into a disengaged position via an additional elastic element 40 (e.g. a spring) arranged between actuator 38 and base 50.

It should be understood that while a support structure having three support members is shown, embodiments of the present disclosure may include any number of support members for providing the device with the ability to be freestanding. In one particular embodiment of the present disclosure, the support structure may comprise only two support members, wherein an end of the housing may be configured to provide support as a third member of the support structure.

The folding nature of the above-described support members provides numerous benefits, including a low-profile housing in the closed position, such that embodiments of the present disclosure may be stored within the interior of an automobile (e.g. in a glove box or door-card pocket). Further, this arrangement provides that the housing may serve as a suitable handle when the device is used for performing the above-described functions of a tire pressure gauge, flashlight, safety hammer and seatbelt cutter.

Device 10 has a battery compartment, indicated, referring to FIG. 3, generally at 70, with user-removable battery compartment door 71 indicated. Battery compartment 70 is located near second end 16 and battery compartment door 71 is intermediate support members 26,28 (and their corresponding recesses in the outer surface of housing 12).

Referring again to FIG. 1, control panel 20 includes display 21, by way of non-limiting examples only, an LCD, LED, or OLED screen for displaying measured tire pressure information, as well as device operating status (e.g. battery level, etc.). A mode button 22 may be configured to alter, for example, the measurement units of the tire pressure gauge (e.g. psi, kPa, or bar), in addition to altering the flashing mode of emergency lighting assembly 15, as set forth above. Control panel 20 may also be provided with buttons 22',22" for on and off, and/or mode control of emergency lighting assembly 15 as well as flashlight 18, respectively. In one embodiment, emergency lighting assembly 15 may be configured to automatically turn on when support members 24,26,28 are deployed into an open position. By way of example, a switch or sensor may be positioned and configured to provide a signal to the one or more processors upon deploying of the support members, and the one or more processors may be configured to provide output signals to turn on the emergency lighting assembly in response to receipt of a signal from the switch or sensor.

As can be seen for example in FIGS. 1 and 3, support member 24,26,28 extend in the first position from second end 16 to a location intermediate first and second ends of housing 12. Control panel 20 is arranged intermediate a distal end of support member 24 and housing first end 14. Emergency lighting assembly 15 is also arranged extending generally to housing first end 14. As housing first end 14 is the uppermost portion of device 10 when the support members are in the second position and supporting the devices, emergency lighting assembly is therefore arranged near the uppermost portion of device 10 when the device is standing on deployed support members 24,26,28, maximizing visibility of the lights.

Figure 4:
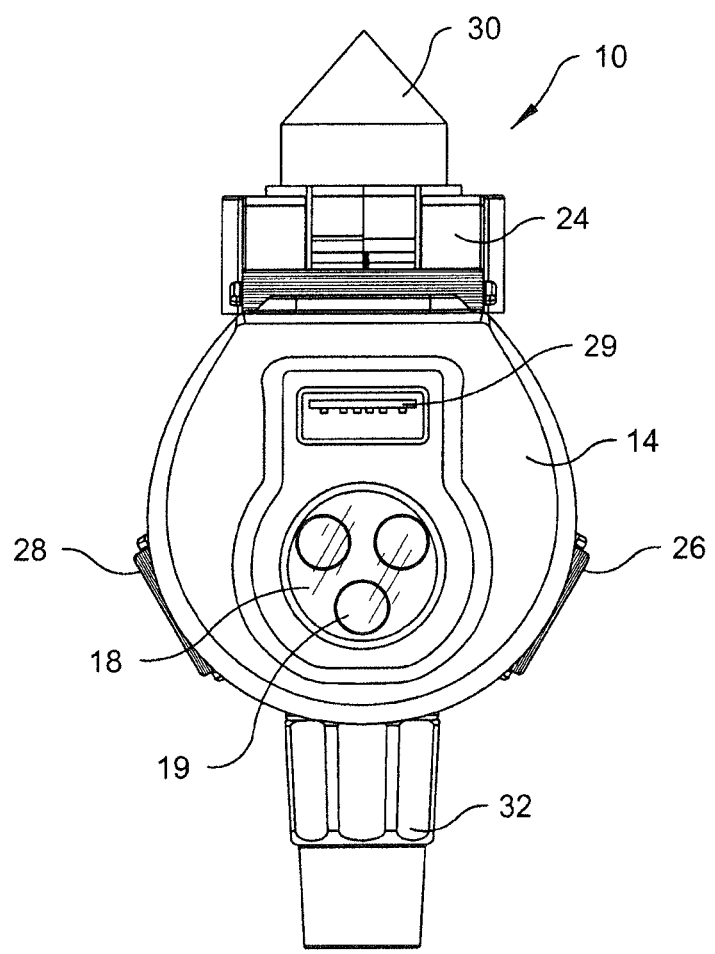
FIG. 4 is a bottom view of the embodiment of the present disclosure of FIG. 1.
Figure 5:
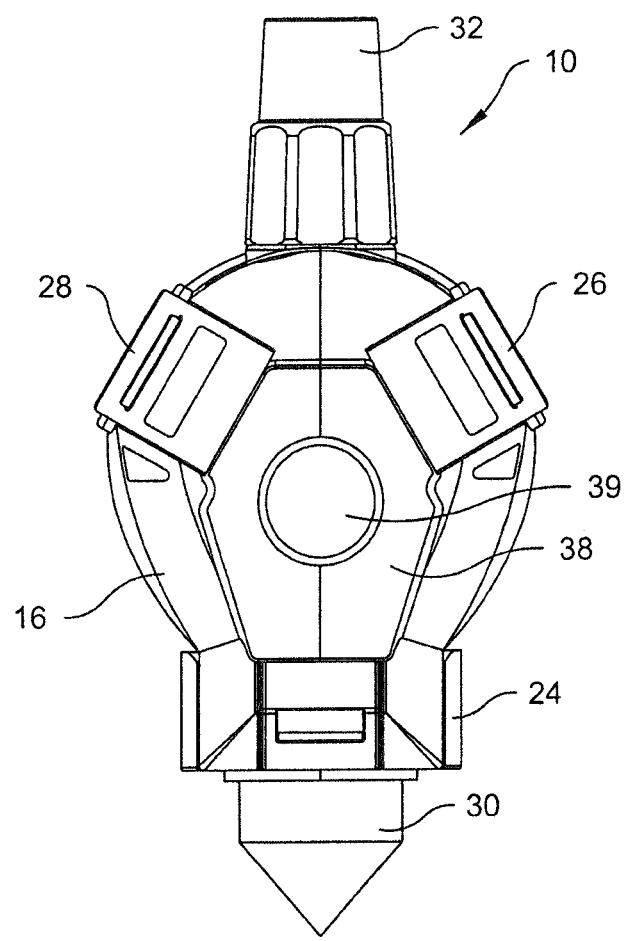
FIG. 5 is a top view of the embodiment of the present disclosure of FIG. 1.

FIG. 4 shows first end 14 of housing 12, including flashlight 18 comprising first light sources 19 (e.g. a plurality of LEDs). Device 10 may also comprise, for example, a USB port 29. USB port 29 may be arranged in communication with a power supply (e.g. a battery) of device 10, such that USB port 29 may be used to charge, for example, a cellular phone. In this way, device 10 may function as a backup power supply as needed by a user. USB port 29 may also be used as a charging port for device 10. More specifically, device 10 may comprise a rechargeable on-board power supply which may be charged via an external charging unit (e.g. an AC/DC adapter, not shown), or an automobile's standard 12v power supply. As noted, the rechargeable power supply may include one or more batteries located in battery compartment 70 near housing second end 16. In embodiments, removable, single use batteries may be employed to provide a power supply. Charging device 10 may also be accomplished through a dedicated external power input 23 (see FIG. 1).

Figure 7:
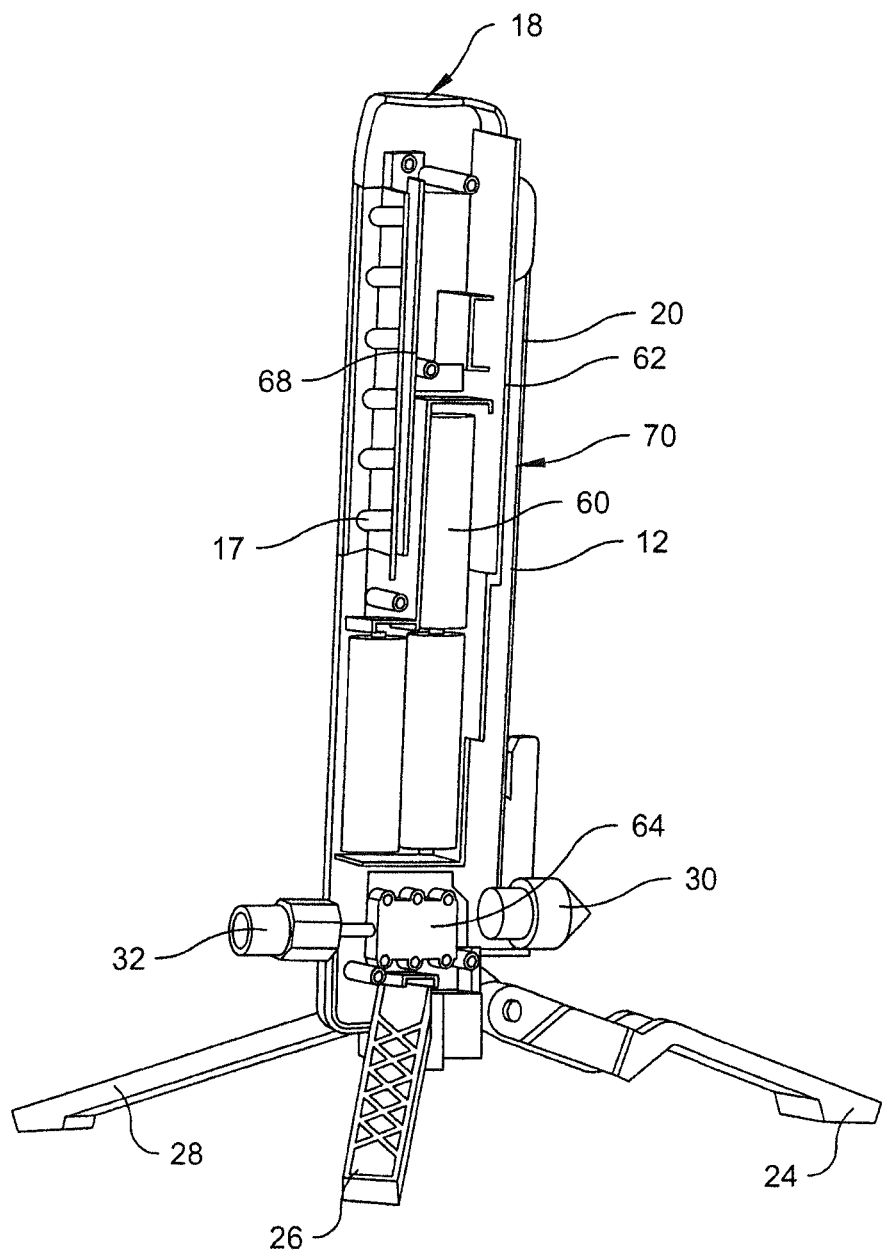
FIG. 7 is a partial cross-sectional view of the embodiment of the present disclosure of FIG. 6.

FIG. 7 is a partial cross-sectional view of device 10, illustrated with a portion of housing 12 removed. In the exemplary embodiment, housing 12 may define a generally hollow structure for accommodating each of emergency lighting assembly 15, including light sources 17, a pressure sensor 64, display 21, and a power supply 66 (i.e. batteries) in battery compartment 70. Light sources 17 and a dedicated processor for control thereof may be arranged on a first printed circuit board (PCB) 68 oriented generally on the second side of housing 12. Likewise, a controller for display 21, associated processing components, as well as any button mechanisms may be arranged on a second PCB 62 arranged generally behind control panel 20 on the first side of housing 12. As set forth above, device 10 comprises a nozzle 32 is arranged in communication with a pressure sensor 64.

Figure 10:
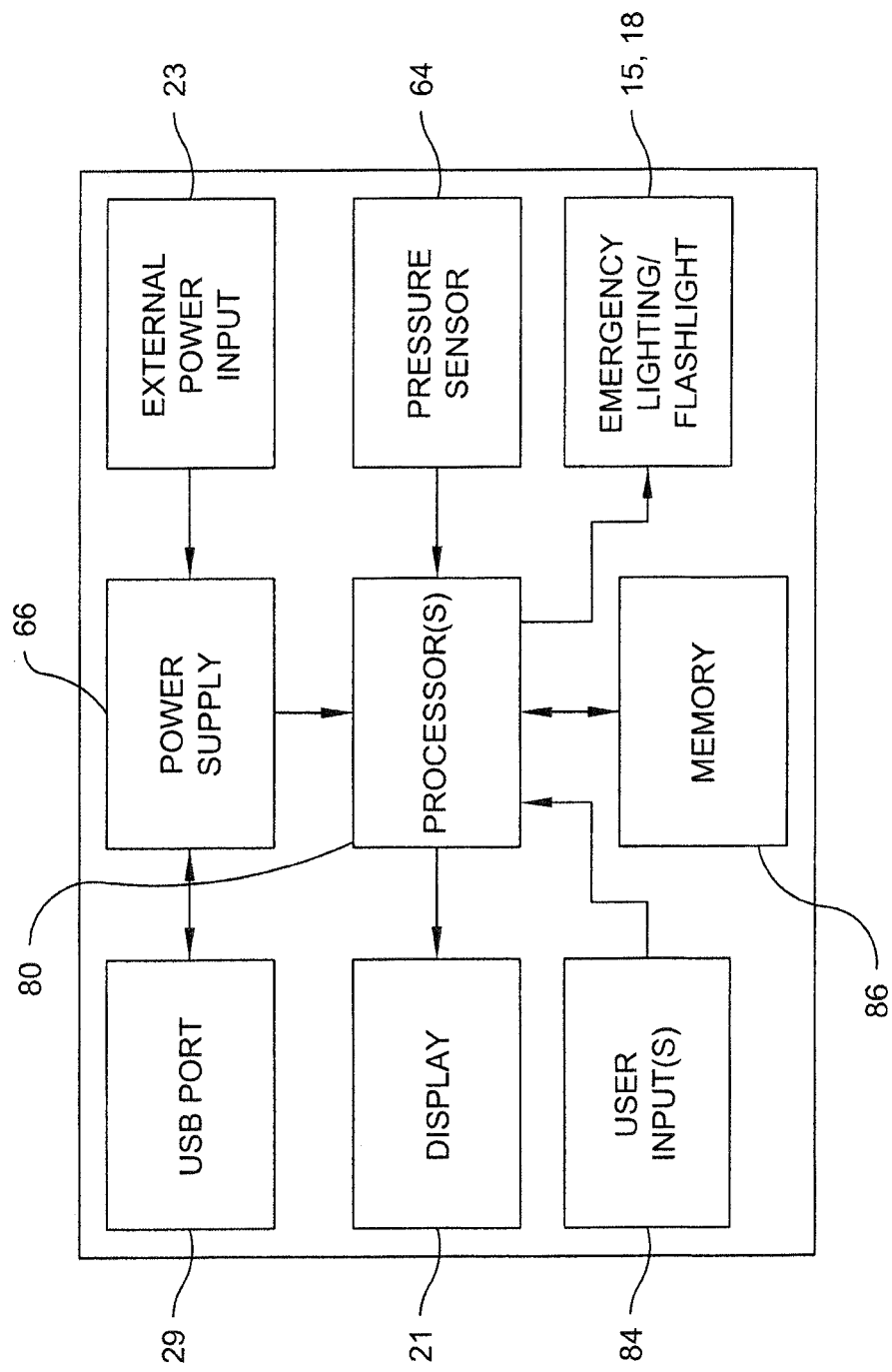
FIG. 10 is a schematic diagram of an exemplary sensory and control circuit arrangement according to an embodiment of the present disclosure.

Referring generally to FIG. 10, a simplified diagram of a sensor and control arrangement is provided according to an embodiment of the present disclosure. Embodiments of the present disclosure may be controlled by one or more processors 80 receiving both user inputs, as well as inputs from the pressure sensor. "Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

For example, processor 80 may receive inputs from pressure sensor 64 and generate outputs indicative of a value of a measured pressure. These outputs may be provided to a user via display 21. Processor 80 may also be responsive to user inputs 84, such as those received via buttons 22,22',22" for controlling one or more of the pressure measuring function, as well as the light sources of emergency lighting assembly 15 and flashlight 18. One or more memory devices 86 may also be in communication with processors 80. Memory device 86 may be configured to store, for example, instructions executable by processor 80 for performing the described device functions, and for storing any measured pressure readings. Memory device 86 may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Power supply 66, such as one or more batteries, may be provided for powering processor 80, as well as for powering any or all of the remaining system components. As set forth above, power supply 66 may comprise a rechargeable power supply capable of being charged and recharged via an external power input 23. Likewise, power supply 66 may operate as a charging source for a cellular phone via a USB port 29.

It should be noted that embodiments of the present invention may include any number of additional components not shown in the simplified schematic of FIG. 10 for the purposes of brevity. For example, the outputs the pressure sensor may comprise an analog signal which may be provided to one or more analog to digital converters (ADCs) before being input to processor 80. Likewise, the output from processor 80 may provide appropriate control signals either directly to display 21, or to a display driver that subsequently provides for control of the display. For any mode of operation, a hold circuit may be used to hold a measured reading in memory, and/or on display 21 for a period of time after a measurement has been taken, allowing a user time to analyze the information after taking a measurement.

It should be understood that while in one embodiment an aperture may be provided in a support member having a profile corresponding to the hammer head and the cutting blade guard, in other embodiments, a support member may have an aperture having a profile corresponding to another element. By way of example, in an embodiment, a support member may have a profile corresponding to the nozzle. In an embodiment, the control panel or one or more elements of the control panel, may be arranged adjacent the second end of the device, and a support member may have a profile corresponding to the display and/or one or more user controls on the control panel. In the illustrated embodiment, the cutting tool is arranged in radial registration with the hammer head; in other embodiments, the cutting tool may be arranged in another location relative to the hammer head.

In the illustrated embodiment, battery compartment 70, nozzle 32 and hammer head 30 are located generally near second end 16. Second end 16 is the lower end of the device 10 when the support members are deployed in the second position. The relatively heavy elements, including the batteries, the metal hammer head and the nozzle, which may be of metal, are positioned near a lower end of device 10, thereby providing a lower center of mass to the device than otherwise, and promoting stability of the device. In addition, the mass of the batteries and the nozzle near the same end as the hammer head provides for a greater moment of inertia when the user grips the device near the opposite end while using the device as a hammer, thereby facilitating the function of breaking glass.

FIGS. 11A-12B illustrate an embodiment of the present disclosure having an alternate freestanding support arrangement. Automotive safety device 100 may include, without limitation, any or all of the features set forth above with respect to FIGS. 1-10. For example, housing 72 comprises a generally elongated profile having a first end 74 and a second end 76. First end 74 may be configured to house a flashlight for emitting light in a generally axial direction with respect to housing 72. Second end 76 of housing 72 may include an emergency hammer head 30, and an emergency cutting tool 11 including a protective guard 35. Device 100 may also include a tire pressure gauge, including a nozzle 32 arranged on second end 76 of housing 72. An emergency lighting assembly 15 may also be provided. It should be understood that the function and control of each of these elements may be similar to that set forth above with respect to the previous embodiments of the present disclosure.

Figure 11A:
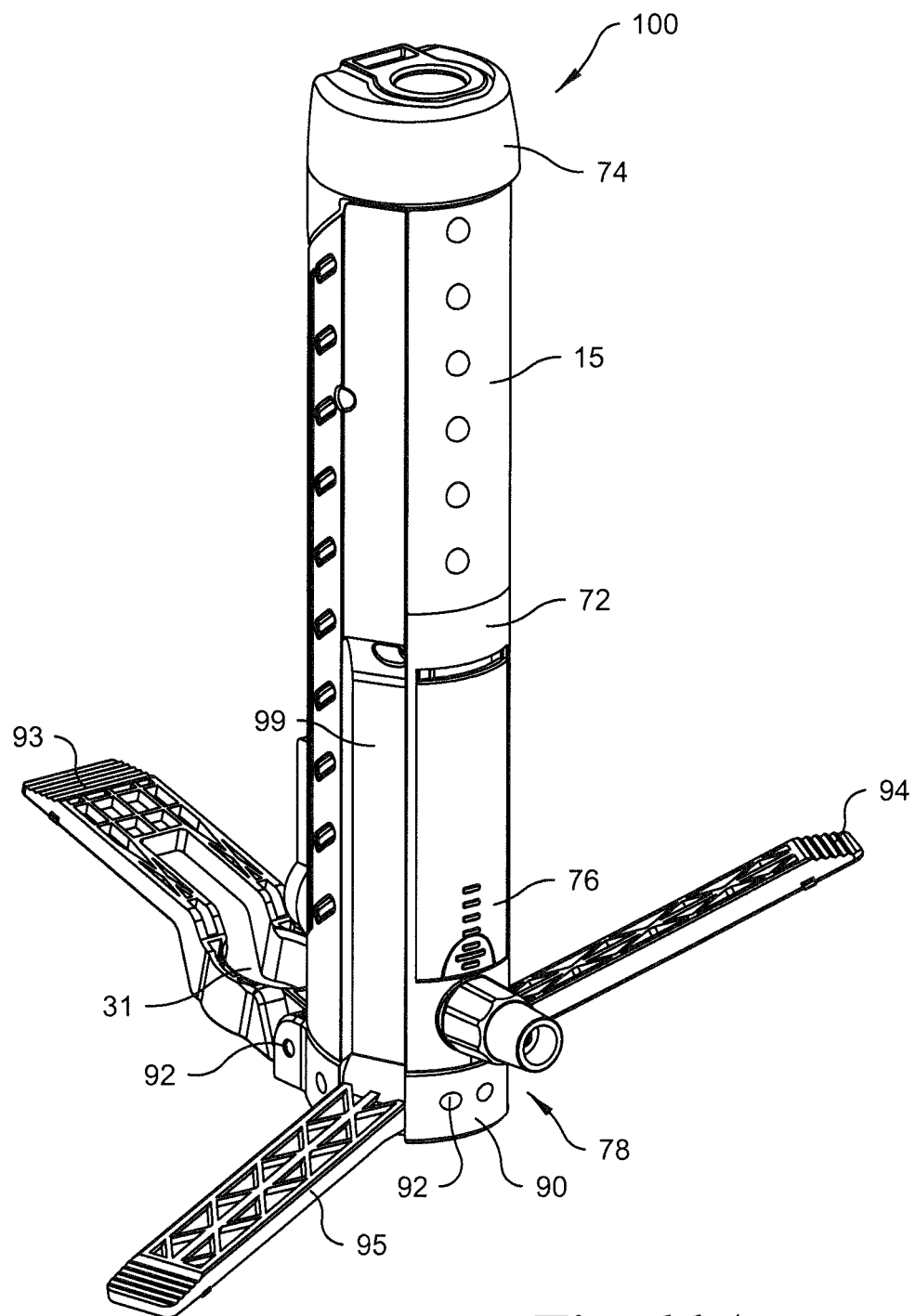
FIGS. 11A-11D are perspective views showing an embodiment of an automotive safety device according to the present disclosure having a removable support assembly including support members attached to a removable support base.

The exemplary freestanding support arrangement of device 100 includes a removable support assembly 78. Support assembly 78 includes, by way of example only, support members or legs 93,94,95 rotatably attached to a support base 90 via, for example, pins 92 arranged through support base 90 and each support member 93,94,95. Support members 93,94,95 are moveable between a first or closed position (not shown), and a second or open position, shown in FIG. 11A. In the first position, device 100 may take on substantially the same profile as illustrated in FIGS. 1-5, wherein support members 93,94,95 are arranged generally parallel to an elongated surface of housing 72. Support member 93, as shown for example in FIG. 11A, is configured with elongated parallel portions having a gap therebetween configured to receive safety hammer 30 when in the first position. Likewise, support members 93,94,95 may be disposed in corresponding recesses 99 formed within housing 72 such that housing 72 retains a generally uniform profile when support members 93,94,95 are oriented in the first position.

Support assembly 78 may be configured to be attachable to housing 72 in at least two configurations, each representing a unique orientation of support base assembly 78 with respect to housing 72. For example, in a first configuration shown in FIG. 11A, support base 90 comprises a first side 91

(FIG. 11B) abutting a surface of second end 76 of housing 72. In this first configuration, support members 93,94,95 may be arranged in the first position, achieving a uniform profile suitable for operating the device as, for example, a flashlight, safety hammer, seat belt cutting tool, or tire pressure gauge, as illustrated in FIGS. 1-5.

Figure 11B:
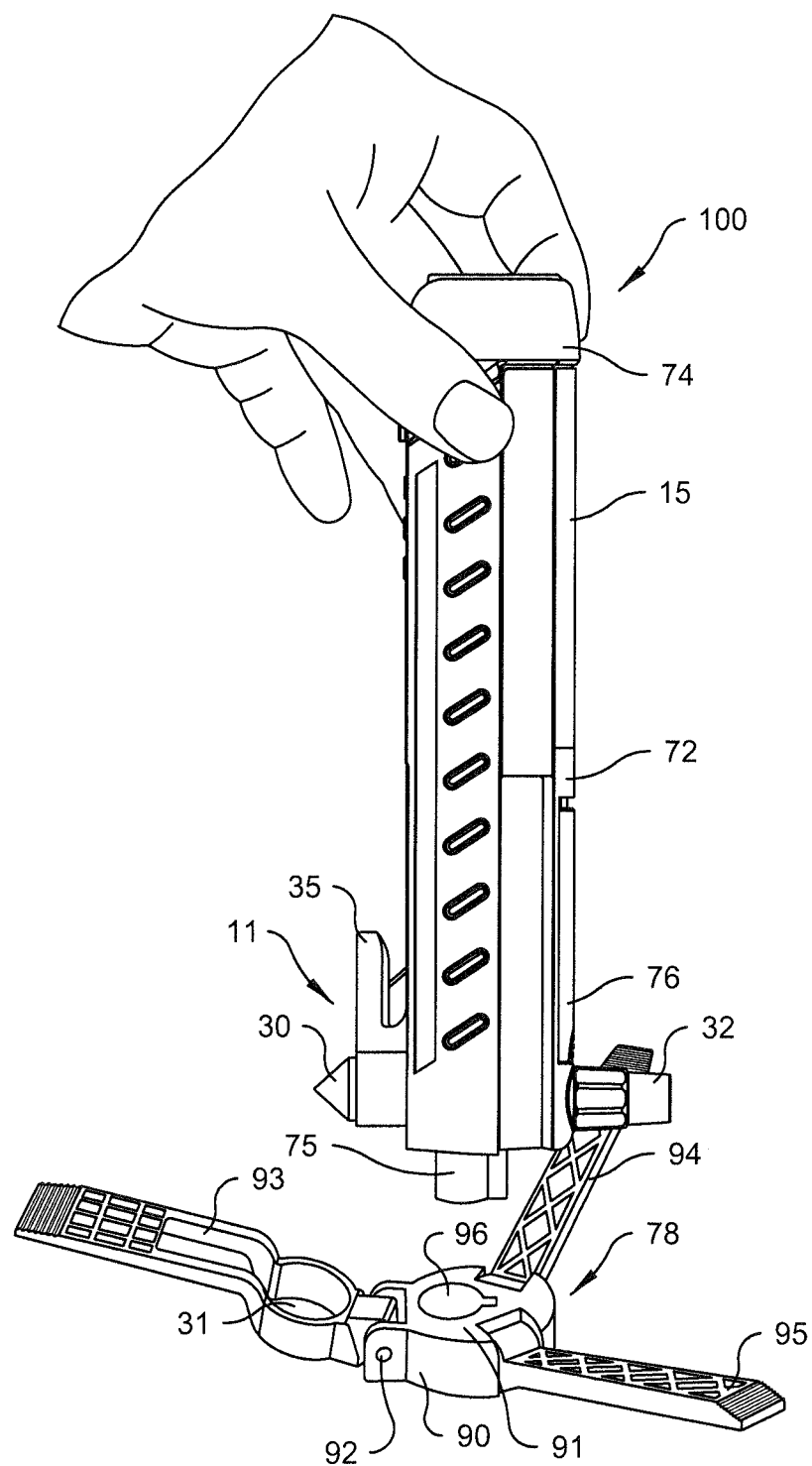
Figure 11C:
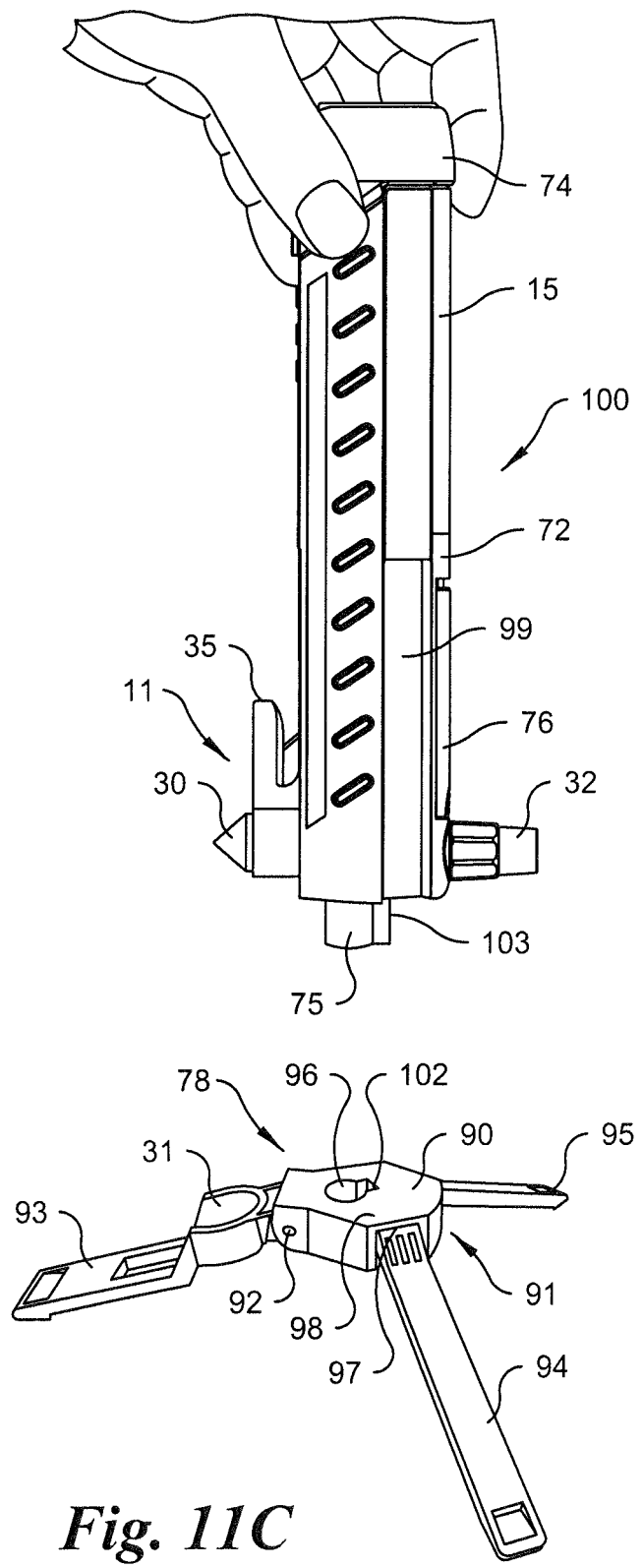

In order to utilize the device as a free-standing emergency light, the support members may be biased (e.g. rotated) into the second position, and the support assembly reoriented into a second configuration with respect to the housing. More specifically, with support assembly 78 in the first configuration, operation of device 100 as a freestanding emergency light includes the steps of biasing support members 93,94,95 into the second position (FIG. 11A) and detaching removable support assembly 78 from housing 72 of device 100 (FIG. 11B). Once detached, removable support assembly 78, including support base 90 and support members 93,94,95, may be reoriented (e.g. rotated 180 degrees, or inverted) with respect to housing 72 (FIG. 11C) and rejoined therewith (FIG. 11D) to define the second configuration of attachment of support base 90 to housing 72. In the second configuration, a second side 98 (FIG. 11C) of support base 90, opposite first side 91, abuts a surface of second end 76 of housing 72. In this second configuration, support members 93,94,95 may be oriented in the second position, forming a tripod-like support structure for providing a stable, freestanding base for device 100. Support members 93,94,95 may be maintained in a desired angular position by, for example, a mechanical positive stop formed on a surface of each support member. For example, positive stop 97 may comprise a generally planar surface configured to abut a corresponding surface of support base 90 when support members 93,94,95 are oriented in the second position, and the weight of device 100 is placed thereon such as when function in the described freestanding manner.

In one exemplary embodiment, support base 90 and housing 72 are removably attached via a corresponding protrusion 75 and aperture 96 formed on second end 76 of housing 72 and support base 90, respectively. Protrusion 75 and aperture 96 may be sized such that a friction fit is formed therebetween when protrusion 75 is inserted into aperture 96. In this way, no additional mechanisms are required to removably secure support base 90 to housing 72. In one embodiment, protrusion 75 and aperture 96 may be formed with complementary non-circular profiles, which may include, for example, a key or rib-like protrusion 103 and a complementary keyway or slot 102 formed on protrusion 75 and aperture 96, respectively. This arrangement ensures that support assembly 78 can only be secured to housing 72 in a predetermined angular orientation and cannot be rotated with respect to housing 72 once installed. It should be understood that any number of alternate aperture and protrusion profiles, alternately defined on or in support base 90 and housing 72, may be used to achieve this non-rotatable positioning without departing from the scope of the present disclosure. Likewise, other mechanical features, by way of non-limiting example only, snap features or corresponding protrusions and recesses, may be used to secure support base 90 to housing 72 without departing from the scope of the present invention. In other embodiments, a circular protrusion and corresponding aperture may be used, allowing for angular adjustment of the support assembly 78 relative to housing 72. This rotatable connection may be useful for providing added flexibility in orienting support members 93,94,95 and/or aiming emergency lighting assembly 15 in a desired fashion.

Figure 12B:
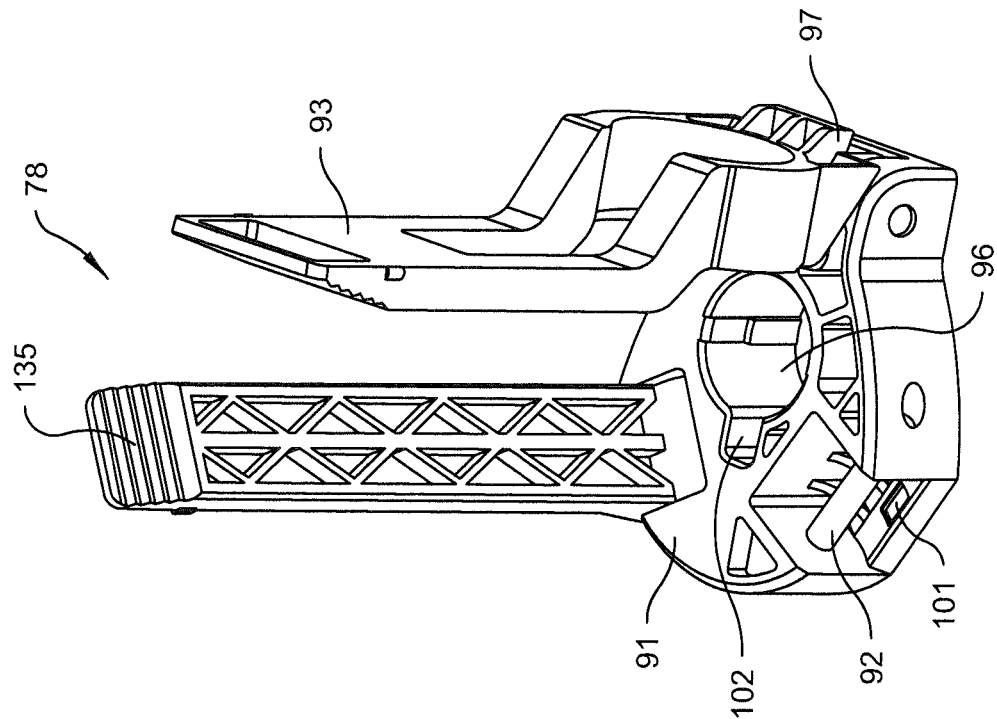
FIGS. 12A and 12B are perspective views of the exemplary removable support assembly illustrated in the embodiment of FIGS. 11A-11D.
Figure 12A:
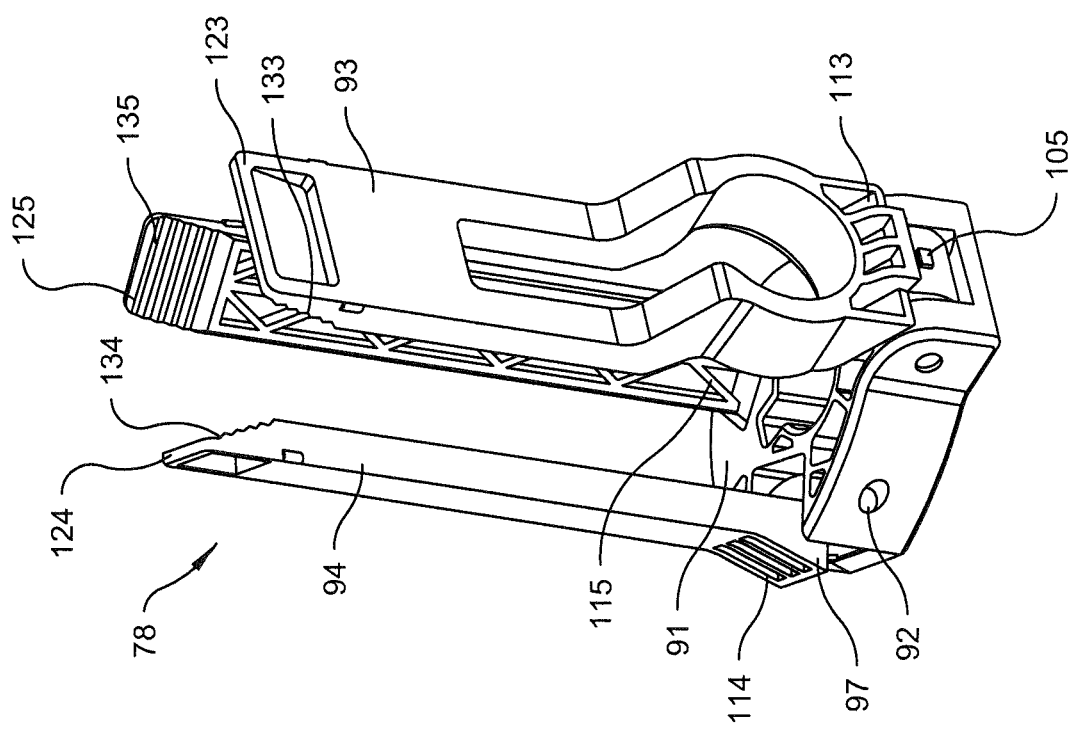

Referring generally to FIGS. 12A and 12B, an exemplary removable support assembly 78 is shown in greater detail. Removable support assembly 78 including support base 90 and support members 93,94,95 are shown in FIG. 12A oriented in the first position. In FIG. 12B, support member 94 has been removed for clarity. As set forth above, support members 93,94,95 may be rotatably or pivotally attached to support base 90 via, for example, a pivot pin 92 arranged through corresponding apertures formed in each support member 93,94,95 as well as support base 90. Each support member 93,94,95 may comprise a mechanical stop 97, embodied herein as a generally planar surface, configured to cooperate with a corresponding structure on support base 90 to limit the rotation of each support member in order to achieve a desired angular orientation in the second position. Additional mechanical stop elements, such as protruding surfaces 105, may be formed on either support members 93,94,95, or on support base 90, for engaging with a corresponding recess 101 formed in a respective one of support base 90 or support members 93,94,95, for retaining support members 93,94,95 in any desired angular position, such as the first and/or second positions set forth herein. Aperture 96 includes a keyway or slot 102 formed therein and configured to accept a complementary rib on protrusion 75 or key-like surface formed on a portion of housing 72, ensuring that support base 90 can only be secured to housing 72 in a predetermined angular orientation and cannot be rotated with respect to housing 72 once engaged therewith.

Figure 11D:
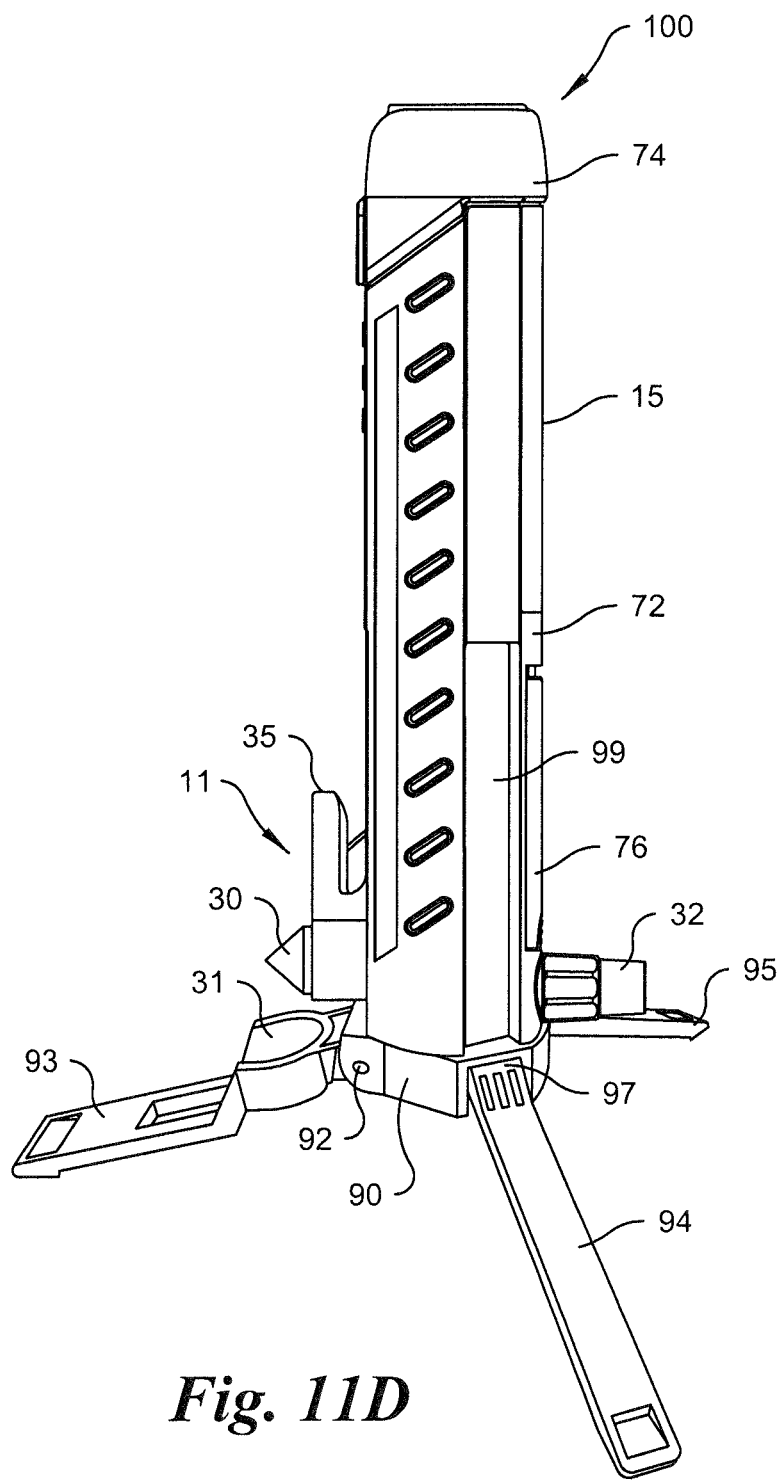

Support member 93,94,95 are each of substantially equal length and have proximal ends 113,114,115 and distal ends 123,124,125 as shown in FIG. 12A. Distal ends 123,124,125 each have beveled surfaces 133, 134, 135 that function as feet. Beveled surfaces 133,134,134 may be patterned, such as by steps as shown, grooves, ribs, knobs, or other features to provide a surface that resists sliding on uneven surfaces. When support members 93,94,95 are extended as shown in FIG. 11D, beveled surfaces 133,134,135 are generally radially equidistant from a center of housing 72 and sit generally in a plane orthogonal to a major axis of housing 72. The combination of the radial separation of beveled surfaces or feet 133,134,135 from the center of housing 72, the downward force of the weight of housing 72, and the configuration of beveled surfaces 133,134,135, including their orientation generally in a plane orthogonal to the major axis of housing 72, as well as their patterned surfaces, serve to support device 100 on any generally flat surface, such as a highway shoulder.

While three legs or support members 93,94,95 are shown in the illustrated embodiment, in other embodiments, more than four legs may be pivotally attached to the support base. In other embodiments, two legs may be pivotally attached to the support base, and may have laterally deployable members to provide a freestanding stable support structure.

The exemplary illustrations are provided by way of example only, and other embodiments for implementing the processes described herein may be contemplated by one of skill in the pertinent art without departing from the intended scope of this disclosure. For example, the processes may be implemented, by way of example, by memory containing instructions, the instructions when executed by a processor, cause the steps of the described methods for measuring tire pressure to be performed. It is understood that these may also be performed in hardware. Thus, the entire process or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. An automotive safety device comprising:
   a housing including a first light source arranged on the housing; and
   a support assembly removably mountable to the housing, the support assembly comprising:
      a unitary support base configured for mounting to the housing in a first orientation with respect to the housing and in a second orientation with respect to the housing; and
      a plurality of support members movably attached to the support base and moveable between a first position and a second position, each of the plurality of support members being arranged directly adjacent to an outer surface of the housing in the first position when the support base is mounted to the housing in the first orientation, and each support member extending outward from the housing in the second position and defining a freestanding support structure when the support base is mounted to the housing in the second orientation.

2. The device of claim 1, wherein the housing further comprises:
   at least one processor in communication with the light source, wherein the at least one processor is configured to control an output of the light source.

3. The device of claim 1, wherein the housing further comprises a hammer head arranged on the housing.

4. The device of claim 3, wherein one of the support members comprises an aperture formed therein which corresponds in profile to the hammer head.

5. The device of claim 3, wherein the housing further comprises:
   a pressure sensor;
   a nozzle arranged on the housing and in communication with the pressure sensor, the nozzle configured to engage a valve of a pneumatic tire and to provide a fluid communication path between an engaged valve and the pressure sensor; and
   a display arranged on the housing and in communication with the at least one processor;
   wherein the at least one processor is arranged in communication with the pressure sensor and is configured to output a value on the display indicative of a pressure measured by the pressure sensor.

6. The device of claim 5, wherein the nozzle is arranged on the housing generally opposite to the hammer head.

7. The device of claim 6, wherein the housing further comprises:
   a cutting tool arranged on the housing on a same side as the hammer head, the cutting tool comprising a blade and a guard; and
   wherein the aperture formed in the one of the support members which corresponds in profile to the hammer head comprises an aperture formed in the one of the support members which corresponds in profile to the guard and the hammer head.

8. The device of claim 5, wherein the housing further comprises:
   a cutting tool arranged on the housing on a same side as the hammer head, the cutting tool comprising a blade and a guard.

9. The device of claim 8, wherein the housing further comprises a second light source arranged on the housing,
   wherein the first light source is arranged on a side of the housing and is configured to emit light generally radially away from the housing; and
   wherein the second light source is arranged at a first end of the housing and is configured to emit light generally axially with respect to the housing.

10. An automotive safety device comprising:
    at least one processor;
    a housing including:
       a first light source arranged on the housing in communication with the at least one processor, wherein the at least one processor is configured to control an output of the light source;
       a pressure sensor arranged on the housing;
       a nozzle arranged on the housing and in communication with the pressure sensor, the nozzle configured to engage a valve of a pneumatic tire and to provide a fluid communication path between an engaged valve and the pressure sensor; and
       a display arranged on the housing and in communication with the at least one processor;
       wherein the at least one processor is arranged in communication with the pressure sensor and is configured to output a value on the display indicative of a pressure measured by the pressure sensor; and
    a support assembly removably mountable to the housing, the support assembly comprising:
       a unitary support base configured for mounting to the housing in a first orientation with respect to the housing and in a second orientation with respect to the housing; and a plurality of support members movably attached to the support base and moveable between a first position and a second position, each of the plurality of support members being arranged directly adjacent to an outer surface of the housing in the first position when the support base is mounted to the housing in the first orientation, and each support member extending outward from the housing in the second position and defining a freestanding support structure when the support base is mounted to the housing in the second orientation.

11. The device of claim 10, wherein the housing further comprises a hammer head arranged on the housing.

12. The device of claim 11, wherein one of the support members comprises an aperture formed therein which corresponds in profile to the hammer head.

13. The device of claim 12, wherein the housing further comprises:
   a cutting tool arranged on the housing on a same side as the hammer head, the cutting tool comprising a blade and a guard; and
   wherein the aperture formed in the one of the support members which corresponds in profile to the hammer head comprises an aperture formed in the one of the support members which corresponds in profile to the guard and the hammer head.

14. The device of claim 11, wherein the hammer head is arranged on the housing generally opposite to the nozzle.

15. The device of claim 11, wherein the housing further comprises:
   a cutting tool arranged on the housing on a same side as the hammer head, the cutting tool comprising a blade and a guard.

16. A safety light comprising:
   an elongated housing having a first end and a second end and including:
      a first light source arranged on a side of the housing and configured to emit light generally radially away from the housing; and
      a second light source arranged at the first end of the housing and configured to emit light generally axially with respect to the housing;
   a support assembly configured for mounting to the second end of the housing and comprising:
      a unitary base removably mountable to the second end of the housing, the base configured to mount to the housing in a first orientation and a second orientation; and
      a plurality of support members movably attached to the support base and moveable between a first position and a second position, each of the plurality of support members being arranged directly adjacent to an outer surface of the housing in the first position when the support base is mounted to the housing in the first orientation, and each support member extending outward from the housing in the second position and defining a freestanding support structure when the support base is mounted to the housing in the second orientation.

17. The light of claim 16, further comprising at least one processor configured to control an output of the first light source.

18. The light of claim 16, wherein the housing further comprises a pressure sensor, a nozzle, and a display, wherein:
   the nozzle is arranged on a side of the housing, the nozzle configured to engage a valve of a pneumatic tire and to provide a fluid communication path between an engaged valve and the pressure sensor;
   the display is on a side of the housing opposite the nozzle and the first light source and intermediate the first and second ends of the housing; and
   the pressure sensor is coupled to the at least one processor and the display and the at least one processor is configured to output a value on the display indicative of a measured pressure.

19. The light of claim 16, wherein the housing further comprises a hammer head arranged on a side of the housing at the second end.

20. The light of claim 16, wherein the housing further comprises a cutting tool arranged on the housing on a same side as the hammer head, the cutting tool comprising a blade and a guard.

* * * * *